United States Patent
Pastouchenko et al.

(10) Patent No.: US 10,486,796 B2
(45) Date of Patent: Nov. 26, 2019

(54) AIRCRAFT HAVING AN AFT ENGINE AND STABILIZER WITH A VARYING LINE OF MAXIMUM THICKNESS

(71) Applicant: General Electric Company, Schenectady, NY (US)

(72) Inventors: Nikolai N. Pastouchenko, Glenville, NY (US); Ivan Malcevic, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 402 days.

(21) Appl. No.: 15/275,596

(22) Filed: Sep. 26, 2016

(65) Prior Publication Data
US 2018/0086438 A1    Mar. 29, 2018

(51) Int. Cl.
*B64C 5/06* (2006.01)
*B64C 5/02* (2006.01)
(Continued)

(52) U.S. Cl.
CPC ............ *B64C 21/06* (2013.01); *B64C 1/16* (2013.01); *B64C 5/02* (2013.01); *B64C 5/06* (2013.01);
(Continued)

(58) Field of Classification Search
CPC ....... B64C 21/06; B64C 5/02; B64C 2230/04; B64C 1/26; B64D 27/20
See application file for complete search history.

(56) References Cited

U.S. PATENT DOCUMENTS

| 2,464,726 A * | 3/1949 | Stalker ............... B64C 27/46 244/17.23 |
| 2,934,259 A * | 4/1960 | Hausmann ............ F01D 5/141 415/181 |

(Continued)

FOREIGN PATENT DOCUMENTS

| EP | 0 505 133 A1 | 9/1992 |
| EP | 0737616 B1 | 2/1998 |

(Continued)

OTHER PUBLICATIONS

Liou et al., "Minimizing Inlet Distortion for Hybrid Wing Body Aircraft", Journal of Turbomachinery, vol. 134, Issue 3, 10 Pages, Jul. 15, 2011.

(Continued)

*Primary Examiner* — Philip J Bonzell
*Assistant Examiner* — Tye William Abell
(74) *Attorney, Agent, or Firm* — Dority & Manning, P.A.

(57) ABSTRACT

An aircraft is provided including a boundary layer ingestion fan mounted to an aft end of a fuselage. A stabilizer is mounted to the fuselage and extends between a root portion and a tip portion to define a span-wise length and extends between a leading edge and a trailing edge along the longitudinal direction. The stabilizer defines a line of maximum thickness that corresponds to the thickest cross sectional portion of the stabilizer along the span-wise length of the stabilizer. The line of maximum thickness is closer to the leading edge of the stabilizer proximate the root portion than at the tip portion, resulting in a pressure distribution that draws higher velocity air away from an inlet of the boundary layer ingestion fan.

15 Claims, 5 Drawing Sheets

(51) Int. Cl.
  *B64C 21/06* (2006.01)
  *B64C 1/16* (2006.01)
  *B64D 27/18* (2006.01)
  *B64D 29/04* (2006.01)
  *B64D 27/20* (2006.01)

(52) U.S. Cl.
  CPC .............. *B64D 27/18* (2013.01); *B64D 27/20* (2013.01); *B64D 29/04* (2013.01); *B64C 2230/04* (2013.01); *Y02T 50/166* (2013.01)

(56) References Cited

U.S. PATENT DOCUMENTS

| | | | |
|---|---|---|---|
| 4,311,289 A | 1/1982 | Finch | |
| 4,736,913 A | 4/1988 | Bennett et al. | |
| 4,749,151 A | 6/1988 | Ball et al. | |
| 4,953,812 A | 9/1990 | Van Der Hoeven | |
| 5,115,996 A | 5/1992 | Moller | |
| 5,417,391 A | 5/1995 | Savitsky et al. | |
| 5,692,704 A * | 12/1997 | Buttgereit | B64C 1/26 244/119 |
| 5,779,189 A | 7/1998 | Hamstra et al. | |
| 5,957,405 A | 9/1999 | Williams | |
| 6,129,306 A | 10/2000 | Pham | |
| 6,149,101 A | 11/2000 | Tracy | |
| 7,309,046 B2 | 12/2007 | Makino | |
| 7,614,588 B2 * | 11/2009 | Birkenstock | B64C 21/06 244/200 |
| 7,818,958 B2 | 10/2010 | Bulin et al. | |
| 7,861,968 B2 | 1/2011 | Parikh et al. | |
| 9,120,552 B2 | 9/2015 | Kreshchishina et al. | |
| 2008/0099610 A1 * | 5/2008 | Jimenez Del Lago | B64C 1/26 244/119 |
| 2010/0163672 A1 * | 7/2010 | Ramirez Blanco | B64C 7/00 244/87 |
| 2010/0200698 A1 * | 8/2010 | Kreshchishin | B64C 1/0009 244/130 |
| 2012/0138736 A1 * | 6/2012 | Cazals | B64C 1/068 244/54 |
| 2013/0062460 A1 * | 3/2013 | Kreshchishina | B64C 1/26 244/54 |
| 2014/0183301 A1 * | 7/2014 | Mora Ordonez | B64C 1/26 244/118.1 |
| 2015/0291285 A1 * | 10/2015 | Gallet | F01D 13/02 415/60 |
| 2016/0176505 A1 * | 6/2016 | Chandrasekharan | B64C 9/00 244/87 |
| 2018/0079514 A1 | 3/2018 | Ramakrishnan et al. | |
| 2018/0086347 A1 | 3/2018 | Shaikh et al. | |
| 2018/0086436 A1 | 3/2018 | Pastouchenko et al. | |

FOREIGN PATENT DOCUMENTS

| | | |
|---|---|---|
| EP | 1550606 A2 | 7/2005 |
| EP | 3 048 042 A1 | 7/2016 |
| FR | 2794718 A1 | 12/2000 |
| GB | 1032274 A | 6/1966 |
| WO | 2011129721 A1 | 10/2011 |
| WO | 2015/053838 A1 | 4/2015 |

OTHER PUBLICATIONS

Guy Norris, "Boundary-Layer Ingestion Key to MIT/NASA D8 Hopes", Aviation Week & Space Technology, Sep. 30, 2013.
Sharma A., "Design of Inlet for Boundary Layer Ingestion in a Blended Wing Body Aircraft", TU Delft, Jan. 29, 2015.
International Search Report and Written Opinion issued in connection with corresponding PCT Application No. PCT/US2017/48789 dated Nov. 27, 2017.

* cited by examiner

AIRCRAFT HAVING AN AFT ENGINE AND STABILIZER WITH A VARYING LINE OF MAXIMUM THICKNESS

FIELD OF THE INVENTION

The present subject matter relates generally to an aircraft having an aft engine, or more particularly to a stabilizer of an aircraft designed to increase an efficiency of the aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also affects the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Positioning a fan at an aft end of the fuselage of the aircraft may assist with reenergizing a boundary layer airflow over the aft end of the fuselage. However, given existing structures at the aft end of the fuselage, such as one or more stabilizers, the airflow ingested by such a fan may not have a consistent velocity profile along the circumferential direction of the fan. More specifically, the structures at the aft end of the fuselage may generate a wake resulting in swirl distortion and an inconsistent velocity profile of the airflow ingested by the fan along the circumferential direction.

Accordingly, an aircraft capable of energizing slow-moving air forming a boundary layer across the fuselage of the aircraft would be useful. Specifically, a stabilizer of an aircraft designed to increase the ingestion of relatively low momentum boundary layer airflow into the aft engine and reduce the non-uniformity and distortion of the velocity profile of ingested airflow would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft defining a longitudinal direction, a vertical direction, and a lateral direction is provided. The aircraft includes a fuselage extending between a forward end and an aft end along the longitudinal direction and a boundary layer ingestion fan mounted to the fuselage at the aft end of the fuselage, the boundary layer ingestion fan defining a centerline and including a plurality of fan blades rotatable about the centerline and a nacelle surrounding the plurality of fan blades. A stabilizer extends between a root portion and a tip portion to define a span-wise length and extends between a leading edge and a trailing edge along the longitudinal direction. The stabilizer is mounted to the fuselage at the root portion and defines a line of maximum thickness, the line of maximum thickness extending between the root portion and the tip portion and indicating a location of a maximum cross sectional thickness along the span-wise length of the stabilizer, the line of maximum thickness being closer to the leading edge of the stabilizer proximate the root portion than at the tip portion.

In another exemplary embodiment of the present disclosure, a boundary layer ingestion fan assembly for mounting to an aft end of a fuselage of an aircraft is provided. The aircraft defines a longitudinal direction, a vertical direction, and a lateral direction. The boundary layer ingestion fan assembly includes a fan rotatable about a central axis of the boundary layer ingestion fan assembly, the fan including a plurality of fan blades. A nacelle surrounds the plurality of fan blades of the fan, the nacelle defining an inlet with the fuselage of the aircraft, the inlet extending substantially around the fuselage of the aircraft when the boundary layer ingestion fan is mounted at the aft end of the aircraft. A stabilizer extends between a root portion and a tip portion and extending between a leading edge and a trailing edge along the longitudinal direction, the stabilizer being mounted to the fuselage at the root portion and having a plurality of horizontal cross sections between the root portion and the tip portion, the stabilizer defining a line of maximum thickness extending through a thickest portion of each of the plurality of horizontal cross sections of the stabilizer, the line of maximum thickness being closer to the leading edge of the stabilizer proximate the root portion than at the tip portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
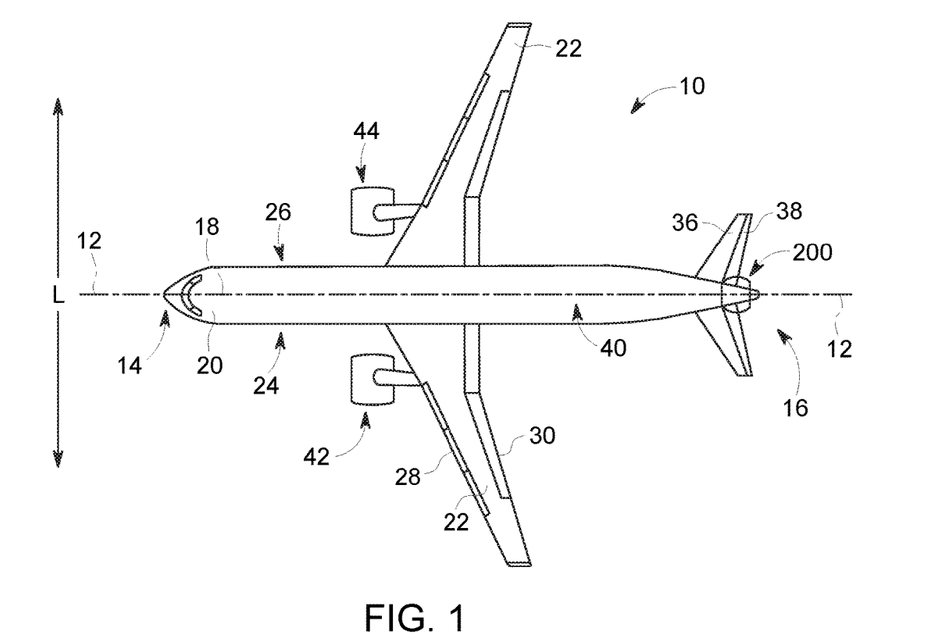
FIG. 1 is a top view of an aircraft according to various exemplary embodiments of the present disclosure.
Figure 2:
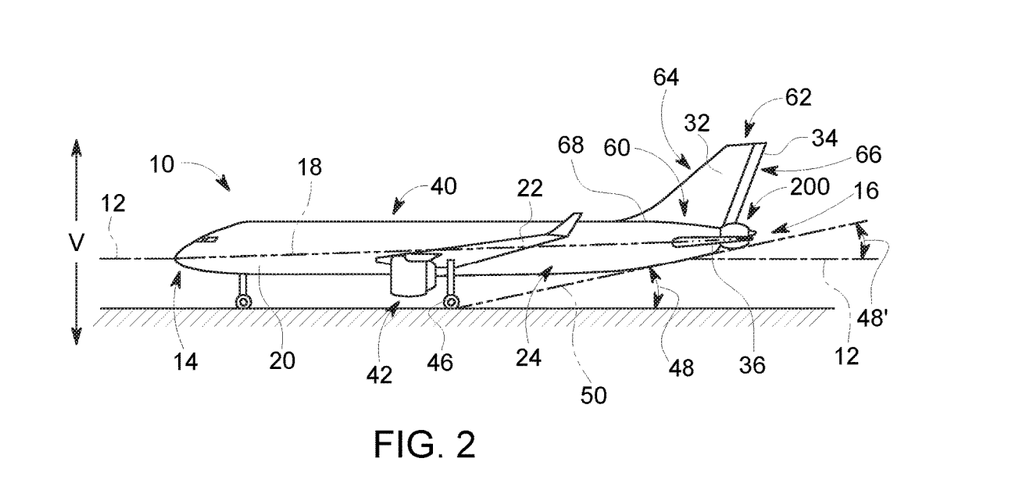
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. As shown in FIGS. 1 and 2 collectively, the aircraft 10 defines a longitudinal direction 12 that extends therethrough, a vertical direction V, a lateral direction L, a forward end 14, and an aft end 16. Moreover, the aircraft 10 defines a mean line 18 extending between the forward end 14 and aft end 16 of the aircraft 10. As used herein, the "mean line" refers to a midpoint line extending along a length of the aircraft 10, not taking into account the appendages of the aircraft 10 (such as the wings 22 and stabilizers discussed below).

Moreover, the aircraft 10 includes a fuselage 20, extending longitudinally from the forward end 14 of the aircraft 10 towards the aft end 16 of the aircraft 10, and a pair of wings 22. As used herein, the term "fuselage" generally includes all of the body of the aircraft 10, such as an empennage of the aircraft 10 and an outer surface or skin of the aircraft 10. The first of such wings 22 extends laterally outwardly with respect to the longitudinal direction 12 from the port side 24 of the fuselage 20 and the second of such wings 22 extends laterally outwardly with respect to the longitudinal direction 12 from a starboard side 26 of the fuselage 20. Each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

As illustrated, each stabilizer extends between a root portion and a tip portion substantially within a single plane. For example, as illustrated in FIGS. 1 and 2, vertical stabilizer 32 defines a root portion 60 and a tip portion 62 separated along the vertical direction V. In addition, vertical stabilizer 32 extends between a leading edge 64 and a trailing edge 66 along the longitudinal direction 12. As illustrated, vertical stabilizer 32 is mounted to fuselage 20 at root portion 60 and extends substantially along the vertical direction V to tip portion 62. In this manner, a junction line 68 is defined at the intersection of vertical stabilizer 32 and fuselage 20. More specifically, junction line 68 extends between leading edge 64 and trailing edge 66 of vertical stabilizer 32. However, it should be appreciated that in other exemplary embodiments of the present disclosure, the aircraft 10 may additionally or alternatively include any other suitable configuration of stabilizers that may or may not extend directly along the vertical direction V or horizontal/lateral direction L. In addition, alternative stabilizers may be any suitable shape, size, configuration, or orientation while remaining within the scope of the present subject matter.

The exemplary aircraft 10 of FIGS. 1 and 2 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Additionally, the propulsion system includes an aft engine 200 mounted to the fuselage 20 of the aircraft 10 proximate the aft end 16 of the aircraft 10, or more particularly at a location aft of the wings 22 and aircraft engines 42, 44. The exemplary aft engine 200 is mounted to the fuselage 20 of the aircraft 10 such that the mean line 18 extends therethrough. The aft engine 200, which is generally configured as an engine that ingests and consumes air forming a boundary layer over fuselage 20, will be discussed in greater detail below with reference to FIGS. 4 through 6.

Referring specifically to FIG. 2, the aircraft 10 additionally includes landing gear, such as wheels 46, extending from a bottom side of the fuselage 20 and from a bottom side of the wings 22. The fuselage 20 is designed to allow the aircraft 10 to takeoff and/or land at a takeoff angle 48 with the ground without the aft end 16 scraping the ground. More specifically, takeoff angle 48 may be defined as the angle between the ground (parallel to longitudinal direction 12) and a takeoff plane 50. As will be discussed below, the exemplary fuselage 20 and aft engine 200 described herein are designed to allow the aircraft 10 to maintain a desired takeoff angle 48, despite the addition of the aft engine 200 proximate the aft end 16 of the aircraft 10. Notably, for the embodiment depicted, the longitudinal direction 12 of the aircraft 10 is parallel to the ground when the aircraft 10 is on the ground. Accordingly, the maximum takeoff angle 48, as shown, may alternatively be defined with the longitudinal direction 12 of the aircraft 10 (shown as angle 48' in FIG. 2).

Figure 3:
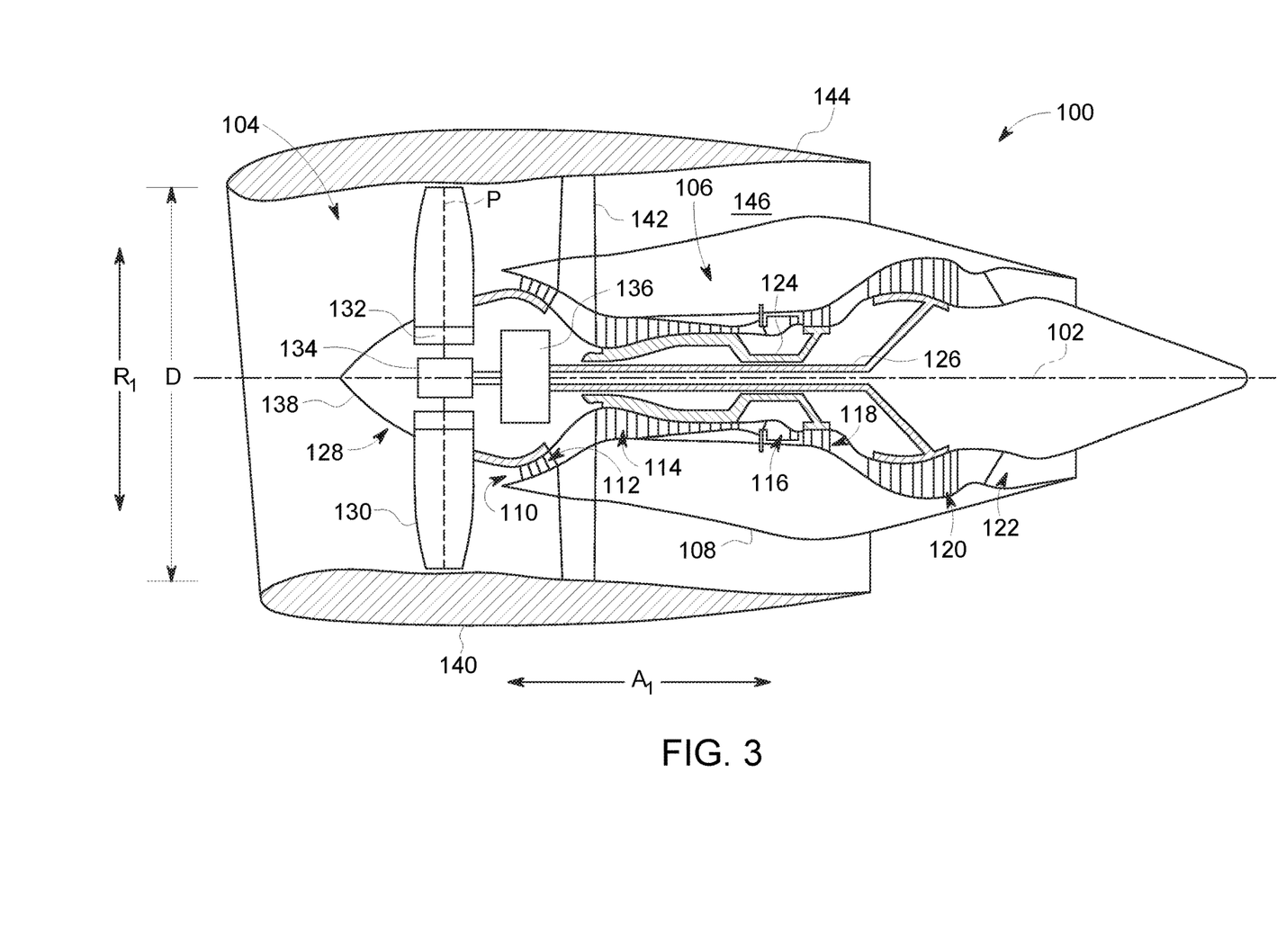
FIG. 3 is a schematic, cross-sectional view of a gas turbine engine in accordance with an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3. Alternatively, however, in other exemplary embodiments, one or both of aircraft engines 42, 44 may be configured as any other suitable engines, such as a turboshaft, turboprop, turbojet, etc.

As shown in FIG. 3, the turbofan engine 100 defines an axial direction $A_1$ (extending parallel to a longitudinal centerline 102 provided for reference) and a radial direction $R_1$. In general, the turbofan 10 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112. The compressor section, combustion section 116, turbine section, and nozzle section 122 together define a core air flowpath.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction $R_1$ and define a fan diameter D. Each fan blade 130 is rotatable relative to the disk 132 about a pitch axis P by virtue of the fan blades 130 being operatively coupled to a suitable actuation member 134 configured to collectively vary the pitch of the fan blades 130 in unison. The fan blades 130, disk 132, and actuation member 134 are together rotatable about the longitudinal direction 12 by LP shaft 126 across an optional power gear box 136. Such an optional power gear box 136 may include a plurality of gears for adjusting the rotational speed of the fan 128 relative to the LP shaft 126 to a more efficient rotational fan speed.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an annular fan casing or outer nacelle 140 that circumferentially surrounds the fan 128 and/or at least a portion of the core turbine engine 106. It should be appreciated that the nacelle 140 may be configured to be supported relative to the core turbine engine 106 by a plurality of circumferentially-spaced outlet guide vanes 142. Moreover, a downstream section 144 of the nacelle 140 may extend over an outer portion of the core turbine engine 106 so as to define a bypass airflow passage 146 therebetween.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines.

Figure 4:
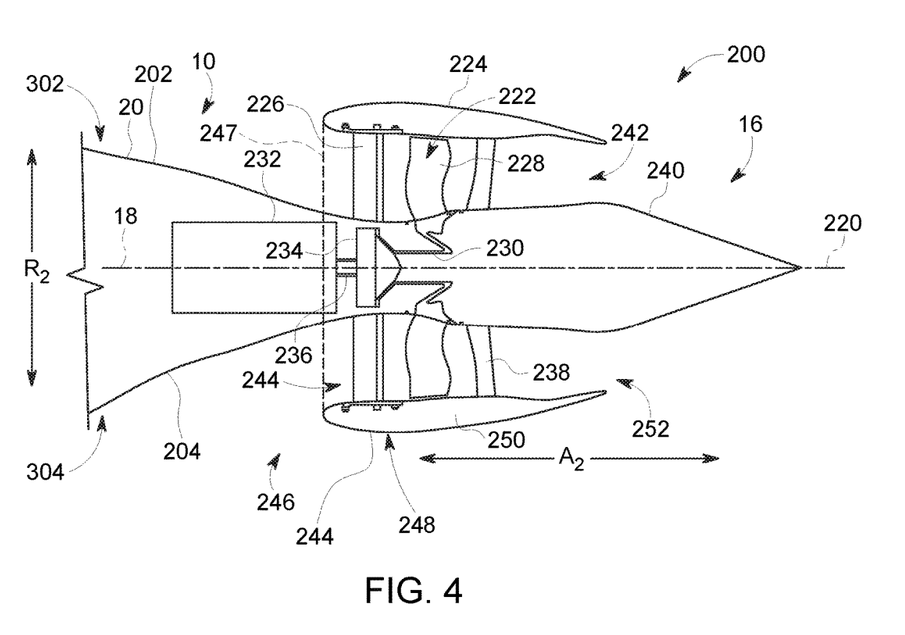
FIG. 4 is a schematic, cross-sectional view of an aft engine mounted to an aft end of the exemplary aircraft of FIG. 1 in accordance with an exemplary embodiment of the present disclosure.

Referring now also to FIG. 4, a close-up, schematic, cross-sectional view of the exemplary aft engine 200 of FIGS. 1 and 2 is provided. As discussed, the exemplary aft engine 200 is mounted to the fuselage 20 proximate the aft end 16 of the aircraft 10. The aft engine 200 depicted defines an axial direction $A_2$ extending along a longitudinal centerline axis 220 that extends therethrough for reference, a radial direction $R_2$, and a circumferential direction $C_2$ (not shown).

Additionally, for the embodiment depicted, the aft engine 200 is configured as a boundary layer ingestion engine configured to ingest and consume air forming a boundary layer over the fuselage 20 of the aircraft 10. The aft engine 200 includes a fan 222 rotatable about the centerline axis 220, a nacelle 224 extending around a portion of the fan 222, and one or more structural members 226 extending between the nacelle 224 and the fuselage 20 of the aircraft 10. The fan 222 includes a plurality of fan blades 228 spaced generally along circumferential direction $C_2$. Additionally, the nacelle 224 extends around and encircles the plurality of fan blades 228 and a portion of the fuselage 20. Specifically, the nacelle 224 extends around at least a portion of the fuselage 20 of the aircraft 10 when, as in FIG. 4, the aft engine 200 is mounted to the aircraft 10.

As is also depicted in FIG. 4, the fan 222 further includes a fan shaft 230 with the plurality of fan blades 228 attached thereto. Although not depicted, the fan shaft 230 may be rotatably supported by one or more bearings located forward of the plurality of fan blades 228 and, optionally, one or more bearings located aft of the plurality of fan blades 228. Such bearings may be any suitable combination of roller bearings, ball bearings, thrust bearings, etc.

In certain exemplary embodiments, the plurality of fan blades 228 may be attached in a fixed manner to the fan shaft 230, or alternatively, the plurality of fan blades 228 may be rotatably attached to the fan shaft 230. For example, the plurality of fan blades 228 may be attached to the fan shaft 230 such that a pitch of each of the plurality of fan blades 228 may be changed, e.g., in unison, by a pitch change mechanism (not shown).

The fan shaft 230 is mechanically coupled to a power source 232 located at least partially within the fuselage 20 of the aircraft 10. For the embodiment depicted, the fan shaft 230 is mechanically coupled to the power source 232 through a gearbox 234. The gearbox 234 may be configured to modify a rotational speed of the power source 232, or rather of a shaft 236 of the power source 232, such that the fan 222 of the aft engine 200 rotates at a desired rotational speed. The gearbox 234 may be a fixed ratio gearbox, or alternatively, the gearbox 234 may define a variable gear ratio.

The power source 232 may be any suitable power source. For example, in certain exemplary embodiments the power source 232 may be an electric power source (e.g., the aft engine 200 may be configured as part of a gas-electric propulsion system with the first and/or second aircraft engines 42, 44). However, in other exemplary embodiments, the power source 232 may alternatively be configured as a dedicated gas engine, such as a gas turbine engine. Moreover, in certain exemplary embodiments, the power source 232 may be positioned at any other suitable location within, e.g., the fuselage 20 of the aircraft 10 or the aft engine 200. For example, in certain exemplary embodiments, the power source 232 may be configured as a gas turbine engine positioned at least partially within the aft engine 200.

Referring still to FIG. 4, the one or more structural members 226 extend between the nacelle 224 and the fuselage 20 of the aircraft 10 at a location forward of the plurality of fan blades 228. The one or more structural members 226 for the embodiment depicted extend substantially along the radial direction $R_2$ between the nacelle 224 and the fuselage 20 of the aircraft 10 for mounting the aft engine 200 to the fuselage 20 of the aircraft 10. It should also be appreciated, however, that in other exemplary embodiments the one or more structural members 226 may instead extend substantially along the axial direction $A_2$, or in any other suitable direction between the axial and radial directions $A_2$, $R_2$. It should be appreciated, that as used herein, terms of approximation, such as "approximately," "substantially," or "about," refer to being within a ten percent margin of error.

The one or more structural members 226 depicted are configured as inlet guide vanes for the fan 222, such that the one or more structural members 226 are shaped and oriented to direct and condition a flow of air into the aft engine 200 to increase an efficiency of the aft engine 200. In certain exemplary embodiments, the one or more structural members 226 may be configured as fixed inlet guide vanes extending between the nacelle 224 and the fuselage 20 of the aircraft 10, or alternatively the one or more structural members 226 may be configured as variable inlet guide vanes.

Moreover, the aft engine 200 includes one or more outlet guide vanes 238 and a tail cone 240. The one or more outlet guide vanes 238 for the embodiment depicted extend between the nacelle 224 and the tail cone 240 for, e.g., adding strength and rigidity to the aft engine 200, as well as for directing a flow of air through the aft engine 200. In addition to providing structural support of nacelle 224, outlet guide vanes 238 are configured for converting flow swirl behind fan 222 into larger pressure rise for generating more thrust. The outlet guide vanes 238 may be evenly spaced along the circumferential direction $C_2$, or may have any other suitable spacing. Additionally, the outlet guide vanes 238 may be fixed outlet guide vanes, or alternatively may be variable outlet guide vanes.

Aft of the plurality of fan blades 228, and for the embodiment depicted, aft of the one or more outlet guide vanes 238, the aft engine 200 additionally defines a nozzle 242 between the nacelle 224 and the tail cone 240. The nozzle 242 may be configured to generate an amount of thrust from the air flowing therethrough, and the tail cone 240 may be shaped to minimize an amount of drag on the aft engine 200. However, in other embodiments, the tail cone 240 may have any other shape and may, e.g., end forward of an aft end of the nacelle 224 such that the tail cone 240 is enclosed by the nacelle 224 at an aft end. Additionally, in other embodiments, the aft engine 200 may not be configured to generate any measureable amount of thrust, and instead may be configured to ingest air from a boundary layer of air of the fuselage 20 of the aircraft 10 and add energy/speed up such air to reduce an overall drag on the aircraft 10 (and thus increase a net thrust of the aircraft 10).

Referring still to FIG. 4, the aft engine 200, or rather the nacelle 224, defines an inlet 244 at a forward end 246 of the nacelle 224. The inlet 244 is defined by the nacelle 224 with the fuselage 20, i.e., between the nacelle 224 and the fuselage 20. As mentioned above, the nacelle 224 of the aft engine 200 extends around and surrounds the plurality of fan blades 228 of the fan 222 of the aft engine 200. For the embodiment depicted, nacelle 224 also extends at least partially around the central axis 220 of the aft engine 200, and at least partially around the mean line 18 of the aircraft 10. Specifically, for the embodiment depicted, the nacelle 224 extends substantially three hundred and sixty degrees (360°) around the central axis 220 of the aft engine 200, and substantially three hundred and sixty degrees (360°) around the mean line 18 of the aircraft 10.

Notably, by positioning the aft engine 200 such that the nacelle 224 of the aft engine 200 extends at least partially around the fuselage 20 proximate the aft end 16 of the aircraft 10, a bottom portion 248 of the nacelle 224 may not interfere with, e.g., the takeoff angle 48 of the aircraft 10 (see FIG. 2). For example, as shown, the nacelle 224 of the aft engine 200 includes at least a portion located inward of the takeoff plane 50 defined by the fuselage 20 (see FIG. 2). Particularly for the embodiment depicted, an entirety of the bottom portion 248 of the nacelle 224 is positioned in-line with, or inwardly of the takeoff plane 50 of the fuselage 20. For at least certain prior art aircrafts, the takeoff plane 50 of the fuselage 20 indicates the conventional shape for a bottom portion of a fuselage at an aft end of an aircraft.

Figure 5:
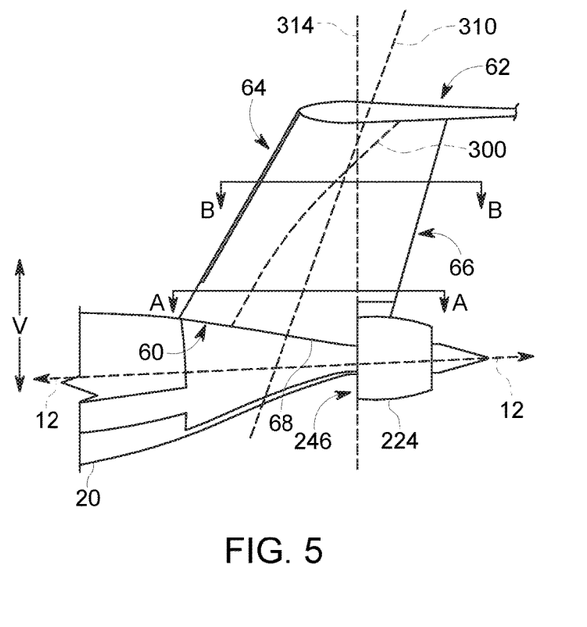
FIG. 5 is a schematic, cross-sectional sideview of an aft engine and a vertical stabilizer mounted to the aft end of the exemplary aircraft of FIG. 1 in accordance with an exemplary embodiment of the present disclosure.
Figure 6:
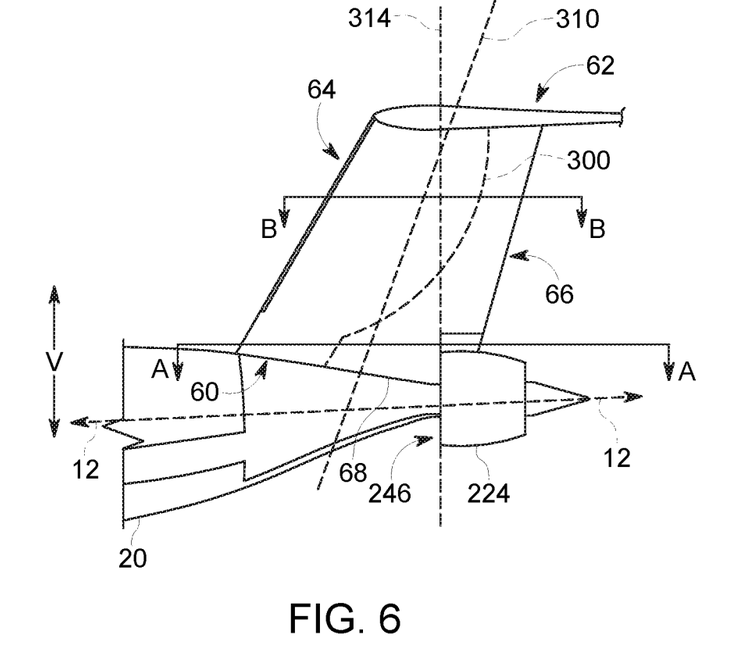
FIG. 6 is a schematic, cross-sectional sideview of an aft engine and a vertical stabilizer mounted to the aft end of the exemplary aircraft of FIG. 1 in accordance with another exemplary embodiment of the present disclosure.
Figure 7A:
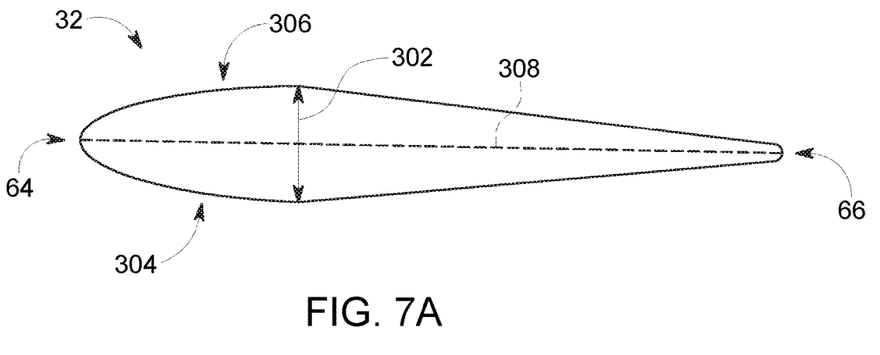
FIG. 7A provides a cross sectional view of the vertical stabilizer of the exemplary aircraft of FIG. 1, taken along Line A-A of FIG. 5.
Figure 7B:
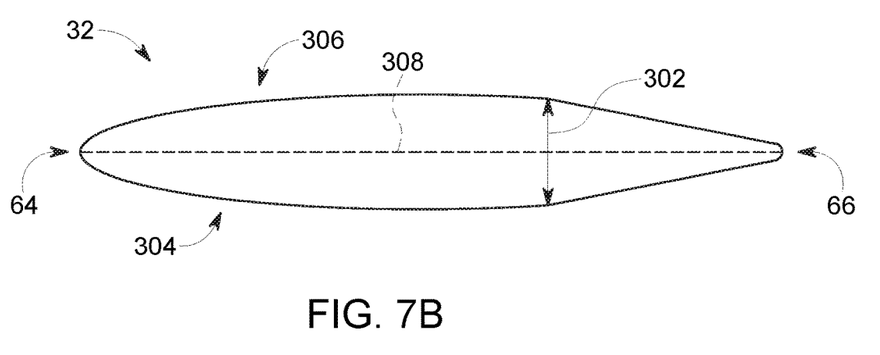
FIG. 7B provides a cross sectional view of the vertical stabilizer of the exemplary aircraft of FIG. 1, taken along Line B-B of FIG. 5.

Referring now to FIGS. 5 through 7, the shape of vertical stabilizer 32 of the exemplary aircraft 10 will be described in more detail. More specifically, FIGS. 5 and 6 provide side views of fuselage 20 and vertical stabilizer 32 according to alternative exemplary embodiments, while FIGS. 7A and 7B provide horizontal cross sectional views of vertical stabilizer 32 taken at Lines A-A and B-B, respectively. Although vertical stabilizer 32 is used herein for purposes of explanation, it should be appreciated that aspects of the present subject matter may be applied to other stabilizers, such as horizontal stabilizers, and other aircrafts. Similarly, although vertical stabilizer 32 is illustrated as being symmetric about a plane defined by the vertical direction V and the longitudinal direction 12, it should be appreciated that the present subject matter may be used with asymmetric stabilizers as well.

As explained above, vertical stabilizer 32 extends between root portion 60 and tip portion 62 to define a span-wise length. In addition, vertical stabilizer 32 extends between leading edge 64 and trailing edge 66 along the longitudinal direction 12. Vertical stabilizer 32 is mounted to fuselage 20 at root portion 60. Referring now specifically to FIG. 5, vertical stabilizer 32 defines a line of maximum thickness 300. The line of maximum thickness 300 extends between root portion 60 and tip portion 62 along the span-wise length of vertical stabilizer 32. The line of maximum thickness 300 generally indicates a location of a maximum cross sectional thickness along the span-wise length of vertical stabilizer 32. More specifically, at any given cross section of vertical stabilizer 32 taken along a horizontal plane, the line of maximum thickness 300 extends through the thickest portion of the cross section as measured along the lateral direction L (as indicated by line 302 in FIGS. 6A and 6B).

For example, referring to FIGS. 7A and 7B, vertical stabilizer 32 defines a first side 304 and a second side 306 located adjacent the port side 24 and the starboard side 26, respectively. In addition, vertical stabilizer 32 defines a chord line 308 which is a straight line extending between leading edge 64 and trailing edge 66. Notably, because vertical stabilizer 32 has a symmetrical cross section, chord line 308 splits vertical stabilizer 32 into two equally sized halves. First side 304 and second side 306 are separated from each other along the lateral direction L, and the maximum cross sectional thickness 302 is defined between first side 304 and second side 306. According to the illustrated embodiment, the maximum cross sectional thickness 302 is measured perpendicular to chord line 308 along each cross section of vertical stabilizer 32.

Referring again to FIG. 5, the line of maximum thickness 300 is closer to leading edge 64 of the stabilizer at or proximate to root portion 60 than at tip portion 62. Notably, as used herein, root portion may refer to an inner twenty percent of vertical stabilizer 32 along the span-wise length and tip portion may refer to an outer twenty percent of vertical stabilizer 32 along the span-wise length. In this regard, the maximum thickness of the cross sections of vertical stabilizer 32 move further toward the aft end 16 of the aircraft 10 as vertical stabilizer 32 extends further away from fuselage 20. For example, as illustrated, vertical stabilizer 32 defines a reference line 310 that extends between root portion 60 and tip portion 62 halfway between leading edge 64 and trailing edge 66. The line of maximum thickness 300 is upstream of reference line 310 proximate root portion 60 of vertical stabilizer 32 and downstream of reference line 310 proximate tip portion 62 of vertical stabilizer 32.

According to an exemplary embodiment, the line of maximum thickness 300 may be located in the forward-most twenty-five percent of vertical stabilizer 32 proximate root portion 60 and in the aft-most twenty-five percent of vertical stabilizer 32 proximate tip portion 62. For example, according to one exemplary embodiment, the line of maximum thickness 300 proximate root portion 60 of vertical stabilizer 32 is located closer to leading edge 64 of vertical stabilizer 32 than to reference line 310. Referring still to FIG. 5, a front lip or forward end 246 of nacelle 224 defines a vertical plane 314. The line of maximum thickness 300 proximate tip portion 62 of vertical stabilizer 32 is disposed downstream of vertical plane 314 along the longitudinal direction 12. It should be appreciated that FIGS. 5 and 6 are only exemplary embodiments illustrating two potential lines of maximum thickness 300. Any other suitable profile for the line of maximum thickness 300 may be used to achieve the desired ingestion of boundary layer air for a particular application.

According to still another exemplary embodiment, a maximum cross sectional thickness 302 of vertical stabilizer 32 proximate root portion 60 is larger than a maximum cross sectional thickness 302 of vertical stabilizer 32 proximate tip portion 62. For example, according to one exemplary embodiment, the maximum cross sectional thickness 302 proximate root portion 60 is at least about ten percent larger, or at least about fifty percent larger, than the maximum cross sectional thickness 302 of vertical stabilizer proximate tip portion 62.

Notably, after the stream of air flowing over vertical stabilizer 32 passes the thickest portion of the airfoil, the velocity of the air increases and the pressure of the air decreases. Therefore, by moving the thickest portion of vertical stabilizer 32 toward the aft end of vertical stabilizer 32 as it extends from fuselage 20, the pressure distribution of air flowing across and along vertical stabilizer 32 has a tendency to draw high velocity airflow (e.g., airflow above the relatively slower moving boundary layer airflow) upward along the vertical direction V. Therefore, vertical stabilizer 32 is configured such that it pushes at least a portion of a layer of high velocity airflow upward along the vertical direction V and outside of nacelle 224 along a radial direction $R_2$ of the aft engine 200.

It should also be appreciated that the cross sections and the line of maximum thickness 300 discussed herein are used only for explaining aspects of the present subject matter and are not intended to be limiting in scope. For example, alternative embodiments of the present subject matter may have a different line of maximum thickness, more aggressive contouring of vertical stabilizer, or may be configured in any other manner suitable for more effectively distributing the boundary layer airflow ingested by aft engine 200. In this regard, vertical stabilizer 32 may be designed to maximize the ingestion of low velocity air by the aft engine 200, to provide a more uniform velocity distribution to the aft engine 200 about the circumferential direction $C_2$ of aft engine 200 and to improve the propulsive efficiency of aircraft 10. In addition, vibration, noise, and wear on the plurality of fan blades 228 may be reduced significantly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a longitudinal direction, a vertical direction, and a lateral direction, the aircraft comprising:
    a fuselage extending between a forward end and an aft end along the longitudinal direction;
    a boundary layer ingestion fan mounted to the fuselage at the aft end of the fuselage, the boundary layer ingestion fan defining a centerline and comprising a plurality of fan blades rotatable about the centerline and a nacelle surrounding the plurality of fan blades; and
    a stabilizer extending between a root portion and a tip portion to define a span-wise length and extending between a leading edge and a trailing edge along the longitudinal direction, the stabilizer being mounted to the fuselage at the root portion and defining a line of maximum thickness, the line of maximum thickness extending between the root portion and the tip portion and at a location of a maximum cross sectional thickness along the span-wise length of the stabilizer;
    wherein the stabilizer defines a reference line extending between the root portion and the tip portion halfway between the leading edge and the trailing edge, and wherein the line of maximum thickness is upstream of the reference line proximate the root portion and downstream of the reference line proximate the tip portion of the stabilizer such that the stabilizer pushes at least a portion of a boundary layer airflow upward along the vertical direction outside of the nacelle along a radial direction of the boundary layer ingestion fan;
    wherein the line of maximum thickness proximate the root portion of the stabilizer is located closer to the leading edge of the stabilizer than to the reference line.

2. The aircraft of claim 1, wherein a front lip of the nacelle defines a vertical plane, the line of maximum thickness proximate the tip portion of the stabilizer being disposed downstream of the vertical plane along the longitudinal direction.

3. The aircraft of claim 1, wherein the stabilizer is a vertical stabilizer mounted to a top side of the fuselage and oriented along the vertical direction.

4. The aircraft of claim 1, wherein the stabilizer is symmetric about a plane defined by the vertical direction and the longitudinal direction.

5. The aircraft of claim 1, wherein the stabilizer defines a first side and a second side, the first side being separated from the second side along the lateral direction and the maximum cross sectional thickness being defined between the first side and the second side.

6. The aircraft of claim 1, wherein the line of maximum thickness is measured perpendicular to a chord line along each cross section of the stabilizer.

7. The aircraft of claim 1, wherein a maximum thickness of the stabilizer proximate the root portion is larger than a maximum thickness of the stabilizer proximate the tip portion.

8. The aircraft of claim 7, wherein the maximum thickness of the stabilizer proximate the root portion is at least about ten percent larger than the maximum thickness of the stabilizer proximate the tip portion.

9. The aircraft of claim 7, wherein the maximum thickness of the stabilizer proximate the root portion is at least about fifty percent larger than the maximum thickness of the stabilizer proximate the tip portion.

10. A boundary layer ingestion fan assembly for mounting to an aft end of a fuselage of an aircraft, the aircraft defining a longitudinal direction, a vertical direction, and a lateral direction, the boundary layer ingestion fan assembly comprising:
  a fan rotatable about a central axis of the boundary layer ingestion fan assembly, the fan comprising a plurality of fan blades;
  a nacelle surrounding the plurality of fan blades of the fan, the nacelle defining an inlet, the inlet extending substantially around the fuselage of the aircraft when the boundary layer ingestion fan is mounted at the aft end of the aircraft; and
  a stabilizer extending between a root portion and a tip portion and extending between a leading edge and a trailing edge along the longitudinal direction, the stabilizer being mounted to the fuselage at the root portion and having a plurality of horizontal cross sections between the root portion and the tip portion, the stabilizer defining a line of maximum thickness extending through a thickest portion of each of the plurality of horizontal cross sections of the stabilizer, wherein the stabilizer defines a reference line extending between the root portion and the tip portion halfway between the leading edge and the trailing edge, and wherein the line of maximum thickness is upstream of the reference line proximate the root portion and downstream of the reference line proximate the tip portion of the stabilizer such that the stabilizer pushes at least a portion of a boundary layer airflow upward along the vertical direction outside of the nacelle along a radial direction of the boundary layer ingestion fan;
  wherein the line of maximum thickness proximate the root portion of the stabilizer is located closer to the leading edge of the stabilizer than to the reference line.

11. The boundary layer ingestion fan assembly of claim 10, wherein a front lip of the nacelle defines a vertical plane, the line of maximum thickness proximate the tip portion of the stabilizer being disposed downstream of the vertical plane along the longitudinal direction.

12. The boundary layer ingestion fan assembly of claim 10, wherein the stabilizer defines a first side and a second side, the first side being separated from the second side along the lateral direction and the thickest portion of each of the plurality of horizontal cross sections being defined between the first side and the second side.

13. The boundary layer ingestion fan assembly of claim 10, wherein the line of maximum thickness is measured perpendicular to a chord line along each of the plurality of horizontal cross sections of the stabilizer.

14. The boundary layer ingestion fan assembly of claim 10, wherein a maximum thickness of the stabilizer proximate the root portion is larger than a maximum thickness of the stabilizer proximate the tip portion.

15. The boundary layer ingestion fan assembly of claim 14, wherein the maximum thickness of the stabilizer proximate the root portion is at least about forty percent larger than the maximum thickness of the stabilizer proximate the tip portion.

* * * * *